Feb. 3, 1931.   I. COWLES   1,791,121
COMPRESSION PIPE COUPLING
Filed April 25, 1925    2 Sheets-Sheet 1
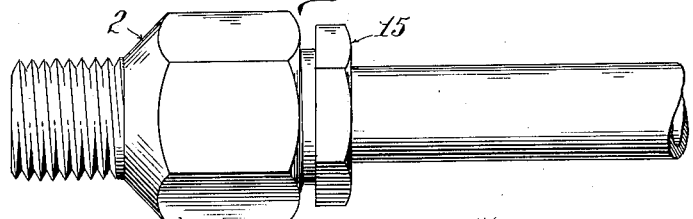
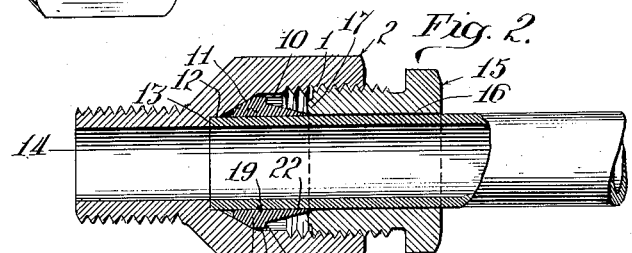
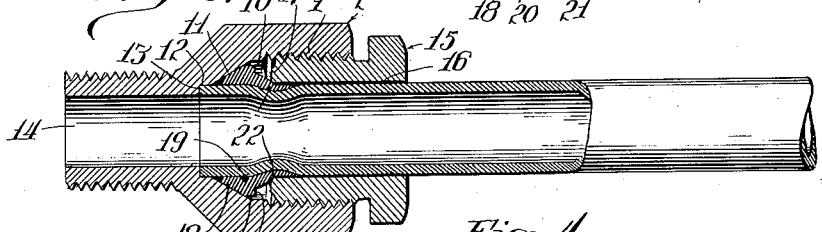
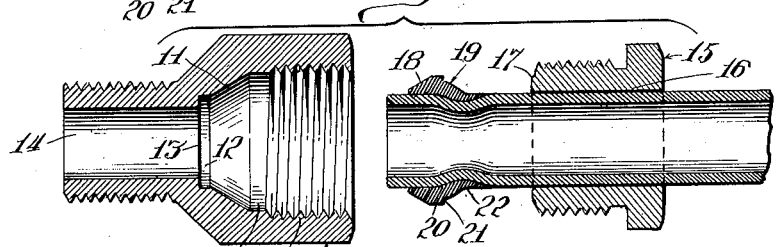
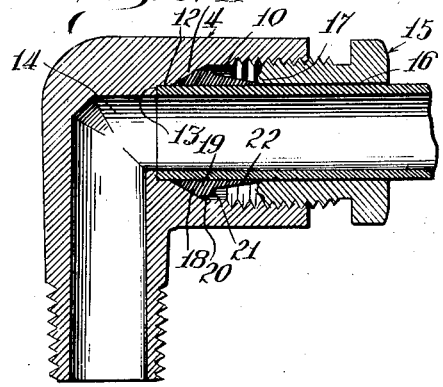
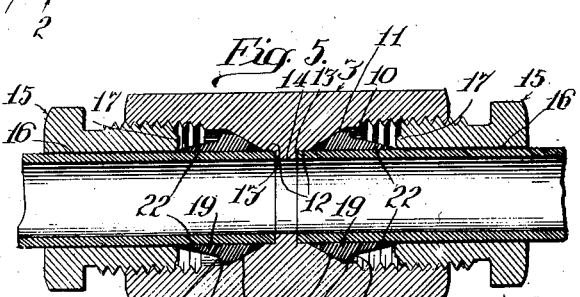
Inventor.
Irving Cowles
By Rudolph Wm. Lotz
Attorney

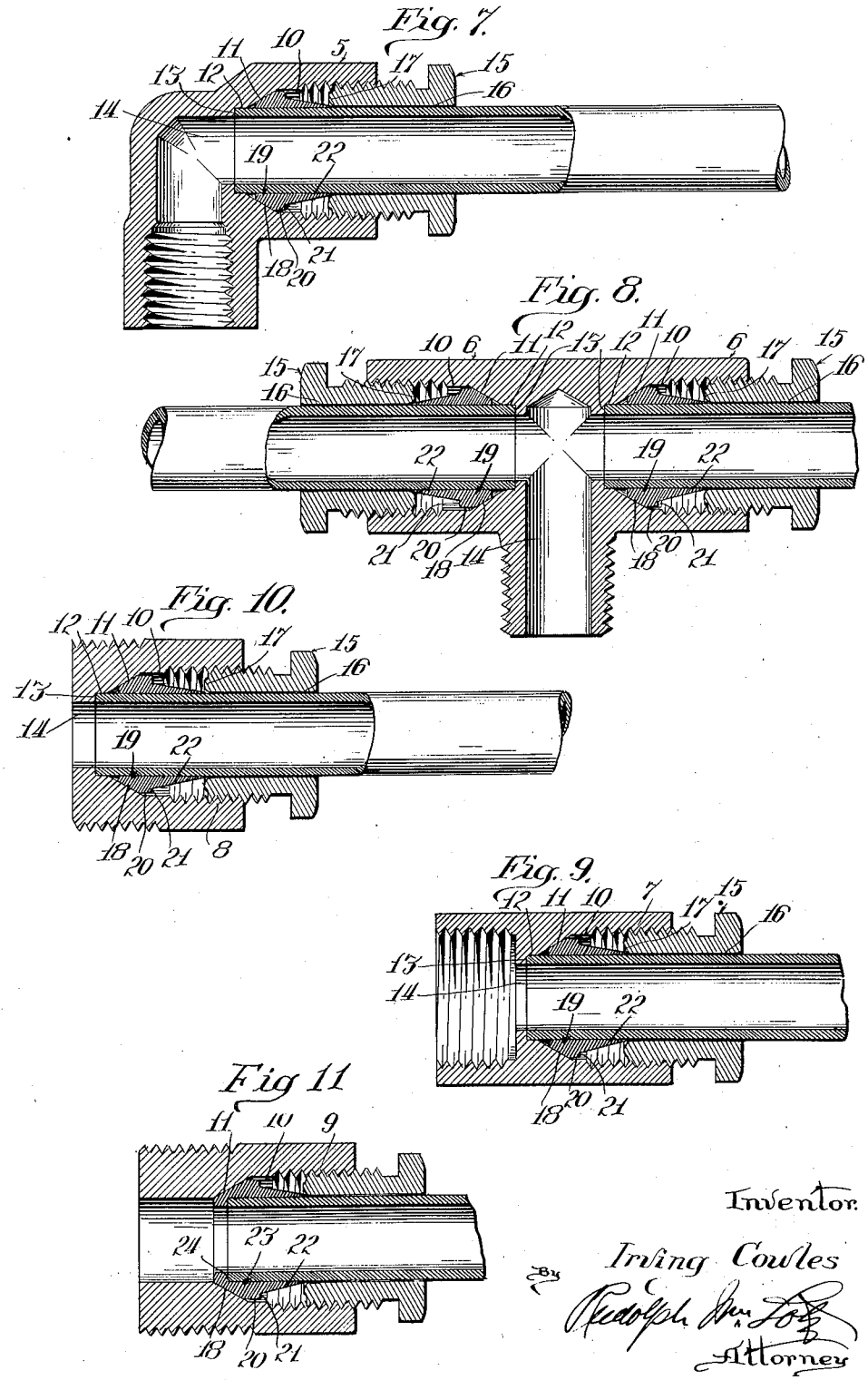

Patented Feb. 3, 1931

1,791,121

UNITED STATES PATENT OFFICE

IRVING COWLES, OF CHICAGO, ILLINOIS, ASSIGNOR TO UNION BANK OF CHICAGO, OF CHICAGO, ILLINOIS, A CORPORATION OF ILLINOIS, TRUSTEE

COMPRESSION PIPE COUPLING

Application filed April 25, 1925. Serial No. 25,873.

This invention relates to that class of devices commonly termed "compression pipe couplings" used for coupling thin, flexible metal tubing, usually copper, with tanks, carbureters, oil pumps, etc. without resorting to threading, soldering, and the like.

The main and general objects of the invention are to provide a device of this character which is very compact, can be easily and cheaply produced by automatic screw machines without other machine or hand operation, may be assembled, mounted and associated with a tube in the shortest possible time, affords ample bearing support or length of engagement with the tubing, does not materially choke the latter, permits uncoupling and recoupling for an unlimited number of times without injury or causing leakage, obviates tortional strain on the tubing during coupling and uncoupling operations, which will not be affected by vibration to effect a loosening of the several component elements to thereby cause leakage or uncoupling; which obviates relative movement between the tubing and the ferrule or valve-like element associated therewith during the initial and subsequent coupling operations; which is adapted to readily accommodate itself to variations (oversize and under size) from the standard diameter tubing for which it is intended; which embodies the type of joint between the ferrule and its seat embodied in the ground joint union used in the plumbing and steam fitting trade for many years; and which may be readily embodied in the several types of pipe-fittings most commonly used.

The invention may be variously embodied and in the accompanying drawings I have shown several of said embodiments. In said drawings:—

Fig. 1 is a side elevation of a male coupling element embodying the invention.

Fig. 2 is a central longitudinal section of the same, showing the component parts of the device in initial assembled relation and a piece of tubing in position for coupling.

Fig. 3 is a view similar to Fig. 2 showing the parts of the device in coupled relation to the tubing.

Fig. 4 is a view of the device showing the several parts in uncoupled position following initial coupling or recoupling as illustrated in Fig. 3.

Fig. 5 is a central longitudinal section of a straight coupling embodying the invention for connecting two pieces of tubing.

Figs. 6 and 7 are respectively, sectional views of a male and a female elbow embodying the invention.

Fig. 8 is a similar view of a T-coupling embodying the invention.

Fig. 9 is a central longitudinal section of a female coupling embodying the invention.

Fig. 10 is a similar view of a male coupling for a close or minimum projection connection between the tubing and a compressor cylinder or other device.

Fig. 11 is a central longitudinal section of a ferrule adapted for connecting a very small diameter tube with a large diameter housing.

The present application is directed to substantially the same subject-matter as applicant's prior application filed April 5, 1923, Serial No. 630,056, allowed July 3, 1924, the drawings accompanying and forming a part of the latter being found insufficient to a complete exposition of the many advantages of the invention over the prior art and the specification whereof is similarly insufficient. A further purpose of the present application is to illustrate and describe a valuable alternative type of embodiment adapting the invention most advantageously to certain conditions frequently encountered in the wide field in which devices of this class are employed.

The device of the invention in its preferred and cheaper embodiments, comprises the internally threaded end 1 of a fitting such as a male coupling 2 (Figs. 1, 2, 3 and 4), either end of a straight or pipe coupling 3 (Fig. 5), one arm of a male elbow 4 (Fig. 6) or of a female elbow 5 (Fig. 7), one or more arms of a T-coupling 6, (Fig. 8), one end of a male coupling 7 (Fig. 9) or of a female coupling 8 (Fig. 10), or a similar portion of any device to which a tube 9 is to be connected.

The said internally threaded element 1 is preferably of polygonal exterior contour such as hexagonal, being readily produced from hexagonal rolls of brass or other metal.

Inwardly of the internal thread there is preferably provided a short cylindrical bore portion 10, and inwardly of the latter a tapered seat portion 11. The latter lies between the cylindrical bore portion 10 and a similar smaller bore portion 12. At the inner end of the latter is an annular shoulder 13 bordering the mouth of the small bore 14, which, generally, corresponds in diameter with the the bore of the tubing of the size for which the coupling is adapted, an end of the tubing being abutted against the shoulder 13 during the coupling operation hereinafter described. The diameter of the bore portion 12 is substantially that of the maximum outer diameter of the tubing to be used, the latter varying from the standard to a very appreciable extent. For example, the five-sixteenths inch outer diameter copper tubing most commonly used will vary fully fifteen thousandths of an inch between maximum oversize to minimum undersize and this fact renders very desirable that the compression coupling shall be capable of accommodating itself to these variations.

The taper of the seat portion 11 is preferably about thirty degrees to the axis of the seat and bores for reasons hereinafter particularly pointed out.

A nut 15, having a central bore 16 corresponding in diameter substantially with the bore portion 12, and a threaded shank, constitutes the male element of the coupling, the bore 16 thereof being slightly chamfered at the inner end of the shank and bordered by an annular flange or lip 17.

Mounted on the seat 11 is the large substantially inflexible or head end 18 of a ferrule 19 presenting a tapered outer surface corresponding to the taper of the seat portion or surface 11 but of slightly less length than the latter. The larger diameter end-portion of said head end of said ferrule terminates in a cylindrical surface portion 20 bordering an annular shoulder 21 disposed substantially midway of the ends of the ferrule, the other end portion of the latter presenting a thin, externally tapered annular flange 22 terminating in a sharp free end opposing the chamfered mouth of the bore of the nut 15. The taper of the said flange 22 is substantially and preferably thirteen and one-half degrees to its central bore which corresponds in diameter with that of the nut 15. The aforesaid degrees of taper may be varied considerably without materially affecting the operation or advantages of the device.

Upon being assembled as shown in Fig. 2, one end of a tube 9 is inserted through the bores of the nut 15 and ferrule 19 into abutment with the shoulder 13. The nut 15 is then rotated to cause it to gradually project more and more over the tapered surface of the flange 22 of the ferrule, thereby contracting said flange by a rolling or spinning action upon and into an annular groove in the outer surface of the tubing, the wall of which is contracted by the pressure exerted upon it by the contracting portion of said flange 22, a portion of which becomes embedded in or housed by said external annular groove in the tubing as shown in Figs. 3 and 4.

Preceding contraction of the flange 22, the nut 15 will force the ferrule firmly upon the seat 11, the degree of taper of the latter, as aforesaid, and the large area of contact between it and the tapered surface of the head of the ferrule providing a sufficiently wedge-like frictional resistance to rotation of the ferrule to overcome the friction of the rotating contact between the flange 22 and nut 15 during the aforesaid coupling operation. This is very important in that it obviates torsional strain on the tubing during the coupling operation, the tubing and ferrule being thus maintained rigid with relation to each other throughout said operation. This causes the ferrule to be so tightly associated with the tubing over a comparatively very large contact area as to obviate subsequent loosening of this association.

The forced contraction of the flange 22 throughout a considerable part of its length also provides a long wedge-like surface contact between the same and the nut 15. This provides what is commonly termed "drag" on the nut frictionally resisting loosening thereof, under the influence of vibration. This is very important in devices of this character and practice has demonstrated that the drag in this instance is such that the nut is not free until after about a three-quarter reverse turn from its innermost position.

The seat 11 and head 18 of the ferrule constitute the elements which correspond to the ground-joint union which has been used in the plumbing and steam-fitting trades for many years, and insures a fluid tight joint that permits of uncoupling and recoupling for an indefinite number of times. It is commonly referred to as a "ball-joint" coupling for the reason that, although the opposed surfaces thereof are not spherical in contour, they will, nevertheless, permit of a considerable degree of relative disalignment of the component elements without causing leakage. This is furthered by providing rounded in place of sharp corners at opposite ends of the tapered surface of the head 18.

Another important feature of a coupling of this type lies in the length of tubing disposed between the shoulder 13 and the outer end of the nut 15 because of the fact that vibration of the tubing produces a considerable strain thereon and tends to break it at the point where it becomes most brittle by reason of compression. In the coupling of this invention, this point of greatest brittleness lies at the deepest part of the annular depression in the tubing and this point is so completely reinforced by the ferrule that breakage does not occur. Furthermore, the joint between the ferrule head and the seat 11 appears to distribute the vibration over the entire length of the tubing disposed between the outer end of the nut 15 and the shoulder 13. This is termed the "bearing-length" which is greater than that of any coupling now on the market or known to applicant.

Compactness of the device is very advantageous from the standpoint of low cost of production and greatest range of adaptability. Production cost is mainly a matter of material as labor constitutes only a very negligible factor in automatic screw-machine work. Hence, a device of minimum size affording maximum bearing length for the tubing together with the advantages incident to the "ball-joint" and the long and shallow annular compression of the tubing, and the several component parts of which are thoroughly adapted for automatic screw-machine production without further or additional operations following delivery from said machines, is of great commercial value, and, as compared to the couplings of the compression type now on the market, applicant's device permits of the use of a steel nut having a head of minimum length and diameter and still possessing the strength necessary to resist rounding of corners by repeated wrenchings for coupling, uncoupling and recoupling and which is far cheaper from the standpoint of cost of material than the nuts generally employed. The cheapness of the material (steel) as compared to brass is equalized to some extent by slower production and greater tool up-keep cost than is incident to brass nuts but the advantage of greater strength and smaller size are of paramount importance and outweigh the defects of softer metal in respect to strength and length.

The invention is also advantageous in that it may be modified to permit a tube of very small diameter to be coupled with a member of larger diameter. This is advantageous in instances where a device embodying the coupling is made of hexagonal rod of larger diameter than is required for coupling a very small diameter tube therewith. To maintain the external contour is desirable and the value of the brass borings incident to maximum inner diameter of the coupling end-portion far outweighs the cost of the drilling and tapping operation. In such cases, as in force feed lubrication devices where minimum size tubing is desirable, the ferrule 23 (Fig. 11) is counter bored to provide the internal annular shoulder 24 adjacent the end of the head 18, the ferrule being in this instance, preferably of greater total length and extreme diameter than would ordinarily be required for the size of tubing to be used. The nut 25 will be of larger external diameter to fit the larger threaded bore of the member 26 constituting the female element of the coupling, the latter being thus hollowed out to the maximum degree to save material (brass), the greater weight and volume of the steel nut 25 being insufficient to outweigh this saving.

As these devices are used on all automobiles and auto-trucks in considerable number and also very extensively in other industries, such as oil-burners and lubrication systems, the importance of minimum production cost coupled with all of the advantages above pointed out and the absence of disadvantages incident to the couplings now in use, will be fully appreciated.

Installation cost also constitutes an important factor and the fact that the device of this invention may be shipped in assembled form, mounted in place without disassembling and the tubing merely cut to length, inserted and coupled, is of paramount importance to the user.

I claim as my invention:

1. A pipe coupling comprising a member provided with an axial bore stepped between its ends to provide a shoulder against which the end of the pipe to be coupled with said member is adapted to abut, and a packing or sealing shoulder disposed to surround the end portion of the pipe abutting against said first-named shoulder the portion of said bore of largest diameter being internally threaded, an externally threaded sleeve having a bore flared at one end and adapted to permit passage of the pipe therethrough, said sleeve engaged with said member, and a member having a similar bore adapted to receive the pipe and having a seat or shoulder portion at one end for seating on the packing or sealing shoulder, the other end portion of said last-named member presenting a thin, tapered contractible wall adapted to enter the flared end of the bore of said sleeve as the latter is projected toward said packing or sealing shoulder while the end of the pipe abuts against said first-named shoulder thereby to seat said last-named member and contract said tapered wall thereof against the pipe.

2. A pipe-coupling including a threaded member equipped with a tapered packing or sealing shoulder, a tapered packing member having a large tapered end portion adapted to seat on said shoulder and provided at its other end with a thin, tapered wall adapted to be contracted about a pipe passed through said packing member, and a member having threaded engagement with said first-named member and adapted to receive and effect contraction of said thin-walled end of said packing member as it forces the latter toward and maintains it seated on said shoulder.

3. A compression pipe-coupling including a member having a large bore portion, and a small bore-portion, the latter provided between its ends with an annular shoulder against which a pipe to be coupled with said member is adapted to abut, there being an annular tapered shoulder at the meeting point of the large and small bore-portions of said member, a collar element having a large end-portion adapted to seat on said last-named shoulder, and a thin, tapered end-portion capable of being contracted about the pipe, and a sleeve adapted to enter the large bore-portion of said member and having a central bore adapted for the passage of the pipe and to receive the terminal end-portion of said thin tapered end of said collar element for effecting contraction of the same for permanently associating the collar element with the pipe.

4. A compression pipe-coupling comprising a coupling member having two annular shoulders of respectively different diameters between its ends spaced from each other and both opposing one end thereof, the larger of said shoulders being tapered, a packing element adapted to seat at the larger end upon one of said shoulders and thereby held against longitudinal movement relatively to said member, and a tapered, contractible other end portion, the other of said shoulders adapted to engage an end of the pipe to be coupled with said member to maintain the same in fixed position relatively to said packing element, and a sleeve associated with said member for forced movement toward said shoulders, said sleeve having a central bore for the free passage of the pipe and reception of the terminal end portion of said contractible end portion of said packing element for effecting contraction of said packing element for permanent association thereof with the pipe as said sleeve is forced toward said shoulders.

5. A pipe coupling comprising a male and a female member threadedly interengaging with each other, and a combined pipe packing and attaching element presenting two oppositely extending tapered end portions, the taper of one end portion exceeding that of the other, one of said end portions presenting a larger body of metal than the other end portion and adapted to seat against the inner face of the female member, the terminal portion of the tapered portion being opposed to the male member for compression thereby upon and into the pipe to be coupled with said female member for permanently connecting said element to the pipe.

6. A pipe coupling comprising a male and a female member threadedly interengaging with each other, and a combined pipe packing and attaching element having oppositely extending outer peripheral tapering portions, the taper of one of said portions being greater than the other, that portion of greater taper presenting a larger body of metal and of greater thickness than the other portion and annularly offset at its point of joinder with the latter, the portion of less taper being compressible by said male member to attach said element to the pipe to be coupled, that portion of greater taper seating against the inner face of said female member, and that portion of less taper extending into the inner end of said male member during and following the attaching of said element to the pipe.

7. A pipe-coupling comprising a female member internally threaded at one end and provided inwardly of said threaded portion with a tapered seat, a packing and coupling sleeve having oppositely externally tapered end portions of respectively different maximum diameters one of which corresponds in taper substantially with the said seat and is adapted to seat upon the latter, the other end portion of said sleeve being flexible and contractible about and into the wall of the tube to be coupled to provide a fluid tight permanent association of said packing element with said tube, and a nut having threaded engagement with said female member and having a central bore to permit passage of a tube therethrough and receive the extreme of the contractible end portion of said sleeve for effecting contraction thereof.

8. A pipe-coupling comprising a female member internally threaded at one end and provided inwardly of said threaded portion with a tapered seat, a packing and coupling element having oppositely externally tapered end portions one of which corresponds in taper substantially with the said seat and is adapted to seat upon the latter, the other end portion of said element being contractible about and into the wall of the tube to be coupled for permanent fluid tight association therewith, and a nut having threaded engagement with said female member and having a central bore to permit passage of a tube therethrough and receive the extreme of the contractible end portion of said element for effecting contraction thereof as said nut is rotated in one direction relatively to said female member, the taper of the meeting portions of said seat and said packing and coupling element being such as to cause the latter to become firmly wedged against rotation relatively to said seat under the influence of the pressure of said nut during and following contraction of the other end portion of said element about the tube, that portion of said packing and coupling member lying between said tapered end portions being of greatest diameter and thickness for preventing distortion thereof under the influence of the pressures applied to said member.

9. A compression pipe coupling including two members having threaded engagement with each other, one thereof provided between its ends with a tapered packing and sealing shoulder opposing the other member, both said members having an axial bore, the bore of the last named element permitting the passage of a pipe therethrough, a packing and coupling element interposed between said members and comprising a large end portion shaped for seating on said shoulder and a thin tapered contractible end portion opposing and adapted to be engaged in the bore of the member opposing said tapered shoulder to be thereby contracted about the pipe to be coupled as said members are relatively rotated in one direction, there being an annular shoulder at the meeting point of the contractible end portions of said element.

10. A compression pipe coupling comprising a packing and coupling member having an axial bore to receive the pipe to be engaged thereby and presenting opposite end portions oppositely tapered at respectively different angles to the axis of said member, one thereof being externally tapered and circumferentially contractible throughout an appreciable portion of its length, the other end portion thereof presenting a tapered seat surface and being incapable of circumferential distortion under the influence of the maximum force required to circumferentially contract the said appreciable portion of its other end, and a pair of members having threaded engagement with each other, one thereof provided with a tapered shoulder for engagement by said tapered seat surface of the coupling member and the other of said threaded members having a formation for receiving and annularly contracting the contractible end portion of the coupling member as said members are rotated relatively to each other in one direction.

11. In a compression pipe coupling, the combination with a pair of members having threaded engagement with each other, of a packing and coupling element comprising a sleeve having two oppositely and differentially tapered end portions, one thereof being of larger diameter than the other and the other end portion being contractible, one of said threaded members having a tapered shoulder between its ends to receive the larger end portion of said sleeve and the other threaded member receiving the extreme end portion of the contractible end portion of said sleeve and adapted to project over an appreciable length of the latter while annularly contracting the same as said threaded members are relatively rotated in one direction.

IRVING COWLES.